United States Patent [19]

Takeuchi et al.

[11] 4,073,545

[45] Feb. 14, 1978

[54] VEHICLE BRAKE CONTROLLING DEVICE FOR ANTI-SKID CONTROL OF VEHICLE WHEELS

[75] Inventors: Yasuhisa Takeuchi, Yokosuka; Kenji Maio, Tokyo; Junichiro Matsumoto, Yokosuka, all of Japan

[73] Assignees: Nissan Motor Company, Limited; Hitachi, Ltd., both of Japan

[21] Appl. No.: 680,864

[22] Filed: Apr. 27, 1976

[30] Foreign Application Priority Data

Apr. 30, 1975 Japan ............................... 50-51392

[51] Int. Cl.² .............................................. B60T 8/10
[52] U.S. Cl. ............................... 303/109; 188/181 C; 361/238; 361/242
[58] Field of Search ................. 188/181 C; 235/150.2; 303/95, 96, 106, 109; 317/5, 6; 324/161; 340/53, 62, 263; 318/52; 361/238, 242

[56] References Cited

U.S. PATENT DOCUMENTS

| 3,498,682 | 3/1970 | Mueller et al. | 303/109 |
| 3,608,978 | 9/1971 | Neisch | 303/96 |
| 3,682,515 | 8/1972 | Packer et al. | 303/20 X |
| 3,701,568 | 10/1972 | Lewis et al. | 303/109 |
| 3,776,604 | 12/1973 | Ooya et al. | 303/20 X |
| 3,807,811 | 4/1974 | Nakamura et al. | 303/109 |
| 3,948,570 | 4/1976 | Fukumori et al. | 303/20 X |

FOREIGN PATENT DOCUMENTS

| 2,534,758 | 1/1976 | Germany | 303/109 |

OTHER PUBLICATIONS

Vahaviolos, S. J., "A Threshold Detector Having a Continuously Variable Bias," Western Electric Technical Digest No. 41, Jan. 1976, pp. 23-24.

*Primary Examiner*—Stephen G. Kunin
*Attorney, Agent, or Firm*—Craig & Antonelli

[57] ABSTRACT

A vehicle controlling device wherein an output signal proportional to vehicle velocity obtained from a vehicle velocity detector and an output signal proportional to wheel velocity obtained from a wheel velocity detector are to be compared by a comparator and the slip state of the wheel is to be detected from the result of the comparison, thereby to control a brake mechanism, characterized in that an adder circuit is provided which adds an output signal proportional to a predetermined wheel velocity at a low vehicle running speed to the output signal obtained from the wheel velocity detector and that the output signal of the adder circuit and the output signal from the vehicle velocity detector are compared by the comparator to ensure accurate brake control at all vehicle speeds.

9 Claims, 4 Drawing Figures ial brake controlling device for anti-skid control of vehicle wheels

BACKGROUND OF THE INVENTION

This invention relates to automatic brake controlling devices for a vehicle, such as an automobile.

In automobile automatic brake control systems, there has hitherto been provided an anti-skid controller in which the slip condition of a wheel is detected by comparing output signals proportional to vehicle velocity and wheel velocity obtained from a vehicle velocity detector and a wheel velocity detector, and the vehicle braking system is controlled on the basis of the detection, whereby the wheel is prevented from being locked and inducing a sideslip or a so-called skid by temporarily releasing the brakes.

In such a controller, however, the wheel velocity signal of the wheel velocity detector can reach such an extremely low level that it cannot be detected or it can become ineffective as the wheel begins to stop or during low-speed running of the automobile. In such a case, notwithstanding the fact that the wheel is not actually locked and slipping with respect to the road surface, it is judged incorrectly to be slipping, and the controller operates so as to slacken the brake effect of the braking system. This leads to the disadvantage that the brake does not operate as it should even though it is applied.

SUMMARY OF THE INVENTION

An object of this invention is to provide a vehicle brake controlling device which has solved the problem occurring when the brake system becomes inactive during stopping or low-speed running of the vehicle.

In order to accomplish this object, the present invention adds a fixed signal to the wheel velocity signal and makes a comparison between the signal representing the result of the addition and the vehicle velocity signal, thereby to more accurately control the vehicle braking system under all conditions.

DETAILED DESCRIPTION OF THE PREFERRED EMBODIMENTS

Figure 1:
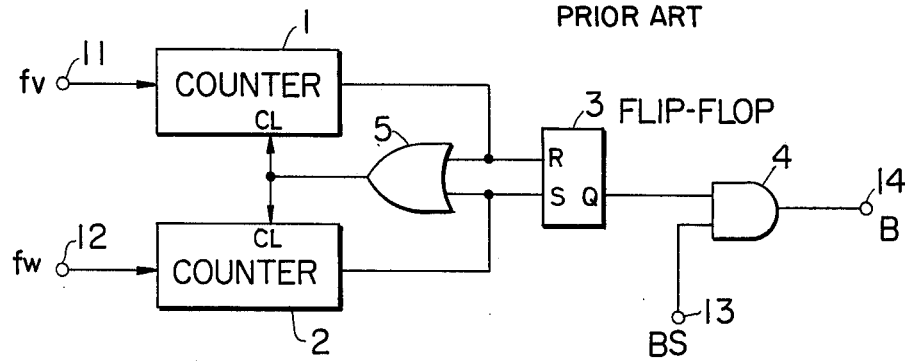
FIG. 1 is a schematic circuit diagram of a prior art vehicle brake controlling device.

FIG. 1 shows a prior art anti-skid controller for use in an automobile brake control system. Trains of pulses at frequencies $f_v$ and $f_w$ proportional to the vehicle velocity and the wheel velocity are produced by a vehicle velocity detector and a wheel velocity detector and are entered into counters 1 and 2 from input terminals 11 and 12, respectively. The counters 1 and 2 count the pulses at the frequencies $f_v$ and $f_w$ and provide outputs when the count values therein have reached predetermined values, respectively. The predetermined count value of the counter 1 is set to be greater than that of the counter 2 by a selected amount.

The vehicle velocity detector, for example, may comprise a speed meter employing the Doppler system of operation and the wheel velocity detector may comprise a tachometer attached to a wheel axis. However, the invention is not restricted to such devices, and any conventional device capable of providing signals proportional to the vehicle velocity or wheel velocity may be employed.

The respective outputs of the counters 1 and 2 are applied to a reset terminal R and a set terminal S of a set-reset flip-flop 3, to reset and set the flip-flop 3, and they are applied to clear terminals CL of the counters 1 and 2 through an OR circuit 5, to clear the counters 1 and 2. A set signal from an output terminal Q of the flip-flop 3 is impressed on an AND circuit 4 together with a brake signal from an input terminal 13. An output of the AND circuit 4 is derived from an output terminal 14 as an output B applied to the brake system which gives rise to a braking action.

With such a construction, the frequencies in the case where the automobile is running without any slip (hereinbelow, the running is termed "normal transit") are set to be $f_v = f_w$. Under such condition, the counter 2 provides an output prior to counter 1, and an output signal "1" of the counter 2 is applied to the set terminal S of the flip-flop 3 to set the flip-flop. Simultaneously therewith, the output signal is applied to the clear terminals CL of both the counters 1 and 2 through the OR circuit 5 and clears them.

On the other hand, the set output signal "1" from the output terminal Q of the flip-flop 3 is applied to the AND circuit 4. Therefore, when the brake signal BS is delivered from the input terminal 13 to the AND circuit 4 under these conditions, the signal B for causing operation of the brake system and initiation of the braking action is provided from the output terminal 14.

In contrast, in the event that the frequency $f_w$ falls below $\alpha f_v$ (where $\alpha$ is constant dependent upon the predetermined count values of both counters and has a value smaller than one) due to the slip of a wheel, as during quick braking, the counter 1 produces an output before counter 2. The output signal "1" of the counter 1 is applied to the reset terminal R of the flip-flop 3 to reset it, and the output signal is also applied through the OR circuit 5 to the clear terminals CL of both the counters 1 and 2 to clear them. At this time, the output signal of the output terminal Q of the flip-flop 3 becomes "0," so that even if the brake signal BS is supplied from the input terminal 13 to the AND circuit 4, the signal B cannot be obtained from the output terminal 14. That is, the brake signal BS is blocked at the AND circuit 4, and therefore, the brake does not operate. In consequence, the number of revolutions of the wheel begins to rise again, and the car can escape from the slip state.

In the prior art control device, however, the output frequency $f_w$ of the wheel velocity detector can reach an undetectable low level or become ineffective as the wheel begins to stop or at low speed running. In such a case, notwithstanding the fact that the wheel is not actually slipping, the output signal "1" of the counter 1 is applied to the reset terminal R of the flip-flop 3 and resets it. As a result, there occurs the inconvenience that even when the brake is applied by the driver, it is not actually operated.

Figure 2:
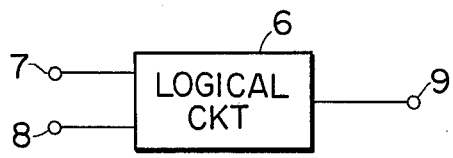
FIG. 2 is a schematic diagram showing one of the essential portions of a vehicle brake controlling device according to this invention.

FIG. 2 illustrates one of the essential portions of the vehicle controlling device according to this invention. Numeral 6 is a logical circuit which performs an addition of the numbers of pulses of pulse train signals applied to input terminals 7 and 8. It is constructed of a circuit which provides an output signal "0" (or "1") from an output terminal 9 in the case where the logic signals of the input terminals 7 and 8 have the same sign and which provides an output signal "1" (or "0") in the case where they have the opposite signs. By way of example, an exclusive-OR circuit may be employed as the logical circuit 6.

Figure 3:
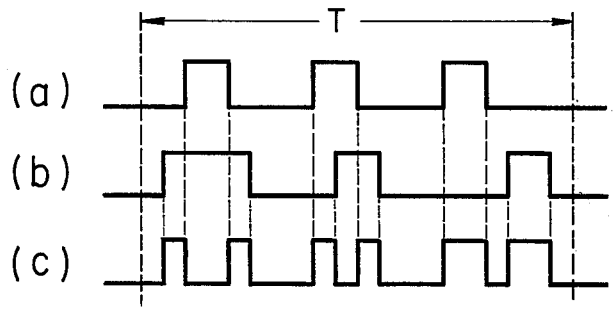
FIG. 3 is a time chart for explaining the operation of the embodiment in FIG. 2.

Accordingly, in the event that the respective input terminals 7 and 8 have received, for example, three pulses during a fixed period T, as illustrated at (a) and (b) in FIG. 3, six pulses being the sum of the input pulses are provided from the output terminal 9, as illustrated at (c) in FIG. 3. Thus, an addition of the numbers of pulses is performed.

In this case, by way of example, a train of pulses at a frequency $f_w$ proportional to the wheel velocity as obtained by a wheel velocity detector is impressed on the input terminal 8, while a train of pulses at a prescribed low frequency is impressed on the input terminal 7. The train of pulses obtained from the output terminal 9 is compared with the train of pulses at a frequency $f_v$ proportional to the vehicle velocity as obtained by the vehicle velocity detector. The braking system of the vehicle is controlled on the basis of the result of the comparison.

Figure 4:
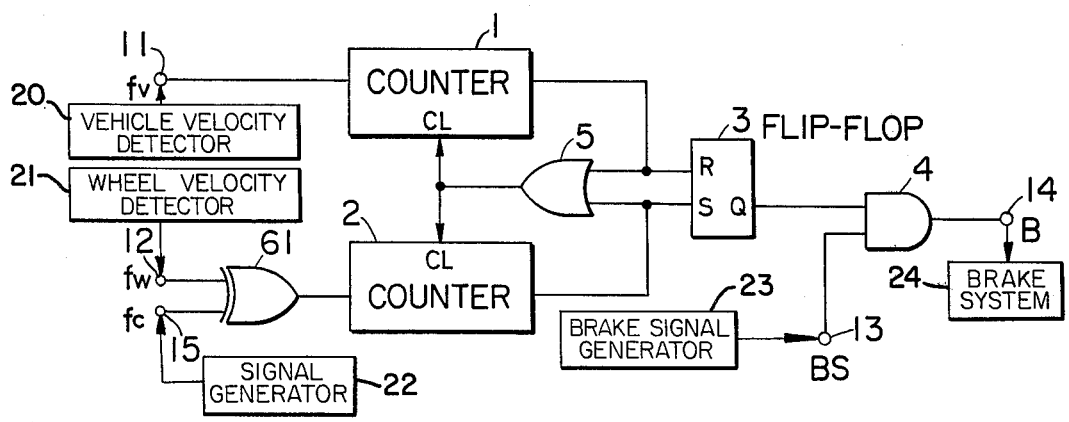
FIG. 4 is a schematic circuit diagram of an exemplary embodiment of the vehicle brake controlling device according to this invention.

FIG. 4 shows an embodiment of this invention in which the logical circuit in FIG. 2 is applied to an antiskid controller. Elements common to the prior art have the same symbols as in FIG. 1. In FIG. 4 an exclusive-OR circuit 61 is provided which receives at its inputs a pulse train signal at a frequency $f_w$ proportional to a wheel velocity as obtained from wheel velocity detector 21 at the input terminal 12 and a pulse train signal at a fixed frequency $f_c$ obtained from signal generator 22 at the input terminal 15 and whose output pulse train is applied to the counter 2 as an input thereof. The remaining circuit construction is quite the same as the circuit illustrated in FIG. 1. Also shown in FIG. 4, in block diagram format, is a vehicle velocity detector 20 which generates the vehicle velocity signal $f_v$ applied to terminal 11, a brake signal generator 23 which supplies the brake signal BS at terminal 13, and a brake system 24 which receives the brake signal B from the output terminal 14 of the end AND gate 4. As the fixed frequency $f_c$, there is selected a frequency proportional to a wheel velocity at low speed, for example, at 5 km/h or so. By setting the frequency $f_c$ at the low frequency, there will be little influence on the frequency signal $f_c$ on brake control during high speed running.

In this way, the frequency $f_w$ from the wheel velocity detector and the fixed frequency $f_c$ are added by the exclusive-OR circuit 61, and the result of the addition is entered into the counter 2. Thus, even in the case where the frequency $f_w$ proportional to the wheel velocity is not provided or is neglected as the wheel is close to stopping or during low speed transit, at least the fixed frequency $f_c$ is entered into the counter 2 and the flip-flop 3 maintains its set condition. It is therefore possible to establish a state under which the brake operates even at very low vehicle speeds. In other words, counters 1 and 2, OR gate 5, and flip-flop 3 cooperate to provide an output signal presents whether or not the ratio of the output of the exclusive-OR gate 61 to the output of the vehicle velocity detector 20 is less than a predetermined value, so as to control the brake operation even at low speeds in dependence upon this predetermined value.

The circuit for adding the frequencies $f_c$ and $f_w$ is not restricted to the example stated above. In general, an adder circuit for alternate signals may be used.

While in the above description reference has been made to an example in which the signals obtained from the vehicle velocity and wheel velocity detectors are digital signals, this invention can, of course, be similarly applied to a system in which signals are obtained from these detectors. In that case, a signal of a fixed output level is employed in place of the signal of the fixed frequency $f_c$. Further, an analog adder is used as the adder circuit, and a comparator of a construction capable of comparing analog signals is used as the signal comparator.

What is claimed is:

1. A vehicle brake controlling device comprising first detection means for detecting vehicle velocity and providing a first output signal proportional to said vehicle velocity, second detection means for detecting wheel velocity of a vehicle wheel and providing a second output signal proportional to said wheel velocity, signal generating means for generating a fixed third output signal proportional to a predetermined wheel velocity at a low vehicle running speed, addition means for adding said second and third output signals of said second detection means and said signal generating means and providing a fourth output signal representing said addition, comparison means for comparing said first and fourth output signals of said first detection means and said addition means and providing a fifth output signal representing whether or not the ratio of said fourth output signal to said first output signal is less than a predetermined value, and control means for controlling a brake system in response to said fifth output of said comparison means.

2. The vehicle brake controlling device according to claim 1, wherein said first and second detection means comprise means to provide signals of frequencies proportional to vehicle velocity and vehicle wheel velocity, respectively, and said signal generating means comprises means to generate a signal of a fixed frequency proportional to a predetermined wheel velocity at a low vehicle running speed.

3. The vehicle brake controlling device according to claim 2, wherein said addition means comprises an exclusive-OR circuit.

4. The vehicle brake controlling device according to claim 2, wherein said comparison means comprises first and second counting means to count the pulses of said first and fourth output signals from said first detection means and said addition means, respectively, and to provide outputs when their count values reach predetermined values different from each other, respectively, and output means to generate a comparison output signal on the basis of said output of said second counting means and to prevent said comparison output signal from being provided on the basis of said output of said first counting means.

5. The vehicle brake controlling device according to claim 2, wherein said comparison means comprises a first counter which counts the pulses of said first output signal from said first detection means and which provides an output when its count value reaches a predetermined count value, a second counter which counts the pulses of said fourth output signal from said addition means and which provides an output when its count value reaches a predetermined count value smaller than said predetermined count value of said first counter, a flip-flop which is set by said output of said second counter and which is reset by said output of said first counter, and an OR circuit which clears said first and second counters in response to the output of either of said first and second counters.

6. The vehicle brake controlling device according to claim 5, wherein said addition means comprises an exclusive-OR circuit.

7. The vehicle brake controlling device according to claim 6, wherein said control means comprises generation means to generate a brake signal, and an AND circuit which takes a logical product between a set output signal of said flip-flop and said brake signal of said generation means and which delivers the logical product output as said signal for operating the brake system.

8. The vehicle brake controlling device according to claim 1, in which said control means comprises generation means for generating a brake signal and logical means for supplying the brake signal from said generation means to the brake system in response to the fifth output signal from said comparison means.

9. The vehicle brake controlling device according to claim 8, in which said logical means comprises an AND circuit.

* * * * *